United States Patent
Meyer et al.

(10) Patent No.: US 7,444,578 B2
(45) Date of Patent: Oct. 28, 2008

(54) DATA UNIT SENDER AND METHOD OF CONTROLLING THE SAME

(75) Inventors: Michael Meyer, Aachen (DE); Reiner Ludwig, Hürtgenwald (DE); Hannes Ekström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 336 days.

(21) Appl. No.: 10/535,355

(22) PCT Filed: Nov. 18, 2002

(86) PCT No.: PCT/EP02/12916

§ 371 (c)(1),
(2), (4) Date: Oct. 14, 2005

(87) PCT Pub. No.: WO2004/047357

PCT Pub. Date: Jun. 3, 2004

(65) Prior Publication Data

US 2006/0156164 A1    Jul. 13, 2006

(51) Int. Cl.
*G08C 25/02* (2006.01)
*H03M 13/00* (2006.01)
*H04L 1/18* (2006.01)

(52) U.S. Cl. .................. 714/748; 714/749; 714/750; 714/751

(58) Field of Classification Search .......... 714/748–751
See application file for complete search history.

(56) References Cited

U.S. PATENT DOCUMENTS

| | | | | |
|---|---|---|---|---|
| 5,774,479 A | * | 6/1998 | Lee et al. | 714/749 |
| 6,289,224 B1 | * | 9/2001 | Boxall et al. | 455/517 |
| 6,389,016 B1 | * | 5/2002 | Sabaa et al. | 370/389 |
| 6,401,127 B1 | * | 6/2002 | Lei et al. | 709/235 |
| 6,405,337 B1 | | 6/2002 | Grohn et al. | |
| 7,154,850 B1 | * | 12/2006 | Cloutier et al. | 370/230 |
| 7,180,871 B1 | * | 2/2007 | Khaflzov et al. | 370/252 |

FOREIGN PATENT DOCUMENTS

| | | |
|---|---|---|
| JP | 04-271327 | 9/1992 |
| JP | 06-136773 | 6/1994 |
| JP | 11-056886 | 9/2000 |

OTHER PUBLICATIONS

Lin D et al: TCP fast recovery strategies: analysis and "improvements" Proceedings. IEEE Infocom '98, The Conference on Computer Communications. Seventeenth Annual Joint Conference of the IEEE Computer and Communications Societies. Gateway to the 21st Century (CAT. 98CH36169), Proceedings IEEE Infocom'98 Conference 0, pp. 263-271 vol. 1, XP002244467 1998, New York, NY, USA, IEEE, USA ISBN: 0-7803-4383-2 abstract.

* cited by examiner

Primary Examiner—Joseph D Torres (57) ABSTRACT

A data unit sender and method of controlling a data unit sender are presented, in which a time-out monitoring procedure implements a first, longer time-out period (SRTO), and a second, shorter time-out period (QRTO), where a retransmission is executed after the shorter time-out period if the available transmission capacity value for unsent data is greater or equal to the size of a designated data unit that is to be retransmitted as a result of time-out monitoring procedure.

24 Claims, 6 Drawing Sheets

DATA UNIT SENDER AND METHOD OF CONTROLLING THE SAME

FIELD OF THE INVENTION

The present invention relates to a data unit sender and a method of controlling a data unit sender, said data unit sender being arranged to operate in accordance with a communication protocol that provides for a feedback function according to which the sender receives feedback messages that report on the receipt of data units at the receiver of the data unit communication. Examples of such feedback messages are explicit congestion notifications (ECN) originating in the network carrying the data communication, acknowledgment messages originating at the receiver of the data communication, which acknowledge the correct receipt of a transmitted data unit, or non-acknowledgment messages that inform of the non-receipt of sent data units.

BACKGROUND OF THE INVENTION

The present invention generally relates to the field of data unit communication. Data unit communication means that an amount of data to be transmitted is divided into individual units, which are then sent over a communication path, e.g. via a network, to a receiver. In the art, such data units carry different names, depending on the specific context and the technology e.g. packet, segment, frame, protocol data unit, etc., and the term "data unit" is used generically in the present application to encompass all such sub-divisions of a data amount.

The concept of data unit oriented communication is usually accompanied by the concept of protocol layering. In other words, data units being sent will adhere to the requirements of a given communication protocol (e.g. the Transmission Control Protocol TCP), and the given protocol will be part of a stack of protocols. The data unit sender and data unit receiver in a given communication of data units of a given protocol are also referred to as peers for said protocol and said communication. A data unit sender for sending data unit of a given protocol will generally receive data from a higher layer and then place this received data into data units adhering to the protocol(s) of the given layer. Generally, a data unit sender will therefore have a buffer for storing data to be sent. The concept of communication protocols and protocol layering is well known in the art and does not need to be explained in more detail here.

Although it is in principle possible that a data unit sender will simply take all data in its send buffer, prepare appropriate data units and send these data units as quickly as possible, data unit senders usually implement a flow control procedure for controlling the flow of data sent by the data unit sender, where said flow control procedure is arranged such that at any given moment the amount of previously unsent data that the sender can send at once is limited by an available transmission capacity value. The reason for this is that the data unit sender will typically not have an infinite amount of bandwidth available for its communication with a data unit receiver. Therefore, it is necessary to implement some sort of restriction on the amount of data that the data unit sender can send at once.

One example of such a flow control procedure is window based flow control, in which the data unit sender maintains a control parameter referred to as the send window, and the data unit sender is not allowed to have more data units outstanding than indicated by the send window. The send window is measured in an amount of data, e.g. bits or bytes. A data unit is referred to as "outstanding" if it has been sent, but the data unit sender has not yet received a feedback message that confirms the correct receipt of said data unit at the data unit receiver. In window based flow control, the amount of data that the sender can send at once is limited to the difference between the send window size and the amount of data in outstanding data units. It is that limit that we refer to as above mentioned "available transmission capacity value". It may be remarked that the data unit sender can maintain a plurality of windows, e.g. such as the congestion window and advertised window known from TCP, where the send window is selected among that plurality, e.g. as the smallest of said plurality. The concept of window based flow control is well known in the art and does not need to be described in more detail here.

Another example of a flow control procedure in which the amount of previously unsent data that the sender can send at once is limited by an available transmission capacity value, is rate based flow control. An example for rate based flow control is the so-called TCP Friendly Rate Control (TFRC) protocol, as described in an Internet draft available from the Internet Engineering Task Force (IETF) at www.ietf.org, e.g. the draft of Oct. 22, 2002 available under http://www.ietf.org/Internet-drafts/draft/ietf-tsvwg-tfrc-05.txt. According to this concept, the data unit sender calculates a transmit rate according to a predetermined throughput equation, such that the amount of data that the sender can send at once is limited by the transmit rate momentarily allowed by the throughput equation.

In data unit communications between a sender and a receiver, it can occur that a sent data unit is lost and does not arrive at the receiver. One mechanism of dealing with such a potential loss of a data unit is the use of a time-out function. A time-out function is arranged such that the data unit sender monitors a time-out period, and if no feedback message for a designated data unit arrives before the time-out period has expired, the designated data unit is retransmitted, as it is assumed that it was lost. Such a time-out concept is employed in many protocols, e.g. in the form of the Retransmission Time-Out (RTO) function in TCP.

It may be noted that it is also known to not only retransmit a designated data unit in response to a time-out period expiring without having received a feedback message for said data unit, but to additionally modify the parameters of the flow control procedure, in order to reduce the amount of unsent data that the sender is allowed to send at once. The reason for this is that due to the time-out, it is assumed that the data unit has been lost, and that therefore the network over which the data units are transported is overloaded. Consequently, it is preferred to reduce the load on the network, which can be done by reducing the amount of data that the data unit sender is allowed to send into the network. For example, the send window in window based flow control can be reduced, or in rate based flow control a parameter in the throughput equation can be modified in order to reduce the allowed transmit rate.

OBJECT OF THE INVENTION

The object of the invention is to provide an improved method of controlling a data unit sender, and an improved data unit sender.

SUMMARY OF THE INVENTION

In accordance with the present invention, it is proposed to control a data unit sender in such a way that the time-out monitoring procedure uses a first time-out period and a second time-out period, where the second time-out period is shorter than the first time-out period. Then, if upon the expiration of the second (shorter) time-out period the available transmission capacity value for unsent data is greater or equal to the size of the designated data unit that is to be retransmitted, then the designated data unit is retransmitted.

In this way, the present invention proposes to implement a short time-out period and a long time-out period, where a retransmission occurs after expiration of the short time-out period if the fair share of load on the part of the data unit sender is not exceeded, i.e., if permitted by the above mentioned "available transmission capacity value". Expressed differently, if the sender is not fully utilizing its transmission capacity for sending yet unsent data, it should be allowed to use this available capacity in any desired way, especially to also retransmit a designated data unit. Thereby, a faster or more aggressive time-out function can be implemented without overloading the network into which the data units are sent.

There can be many reasons why a data unit sender is not fully using its available transmission capacity. For example, this can be due to the fact that the data unit sender is not receiving more data from a higher layer, e.g. from an application that generates data for the data unit sender to transmit. This can e.g. be the case in interactive applications, such as Telnet, chat, or WWW-interactions, in which the data unit sender (when using the Internet, the data unit sender can be a TCP sender) only has very few data units outstanding (outstanding data units are sometimes also referred to as data units "in flight") at any given time, because the sending application does not have more data to send. On the other hand, using the TCP sender as an example, if the send window is large, then the difference between the send window size and the data in outstanding packets is also large, and the data unit sender could send more data at once, if such data were present. In accordance with the present invention, the data unit sender can then implement a more aggressive time-out feature and retransmit potentially lost data units more quickly. This increases the data throughput, without overloading the transmission network, as the transmission capacity available to the data unit sender is sufficient for the retransmission.

If upon expiration of the shorter (second) time-out period, the available transmission capacity value is not sufficient for re-transmitting the designated data unit, then the time-out mechanism employs the longer (first) time-out period, and retransmits the designated data unit if no feedback message is received within the longer time-out period, regardless of the available transmission capacity, as is known conventionally, e.g. from the RTO mechanism of TCP. According to a preferred embodiment, the concept of the present invention is applied to a TCP sender, and the first (longer) time-out period is the conventional RTO value.

As explained above, one of the basic aspects of the present invention is to allow the data unit sender to employ a more aggressive time-out period if the available transmission capacity allows this. It is not important why there is any transmission capacity available, e.g. in a window based flow control system, why the send window is not being fully utilized. This can be due to the fact that there is no or only little data to be sent in the send buffer, or there can be other reasons for holding back data in the send buffer, e.g. that the data unit sender is waiting for the data received from a higher layer to be placed into a desired order. In accordance with a preferred embodiment of the present invention, the designated data unit is only retransmitted upon expiration of the second (shorter) time-out period if the amount of unsent data in the send buffer is smaller or equal to a predetermined threshold value. In accordance with this preferred embodiment, the sending of data in the send buffer is accorded priority over the more aggressive retransmission of data units, such that if there is more than a predetermined threshold of yet unsent data in the send buffer, no retransmission is conducted upon expiration of the shorter time-out period, in order to leave the available transmission capacity for the (potential) sending of yet unsent data.

BRIEF DESCRIPTION OF FIGURES

Further aspects and advantages of the present invention shall be explained in connection with the description of specific embodiments, with reference to the appended figures, in which.

DETAILED DESCRIPTION OF PREFERRED EMBODIMENTS

In the following, detailed embodiments of the present invention will be described. It is noted that this description of detailed embodiments serves to provide the skilled person with a better understanding of the invention, but is not intended to be limiting for the invention. The invention is defined by the appended claims. Also, in the course of describing embodiments, reference will sometimes be made to window-based flow control, and more specifically to the transmission control protocol TCP as a preferred example. However, it should be noted that the present invention is by no means restricted to window based flow control or TCP. Much rather, the present invention is applicable in the context of any data unit sender having a limited available transmission capacity value and implementing a time-out monitoring procedure. In this way, the invention can e.g. also be applied to rate based flow control, such as the TFRC protocol.

Figure 1:
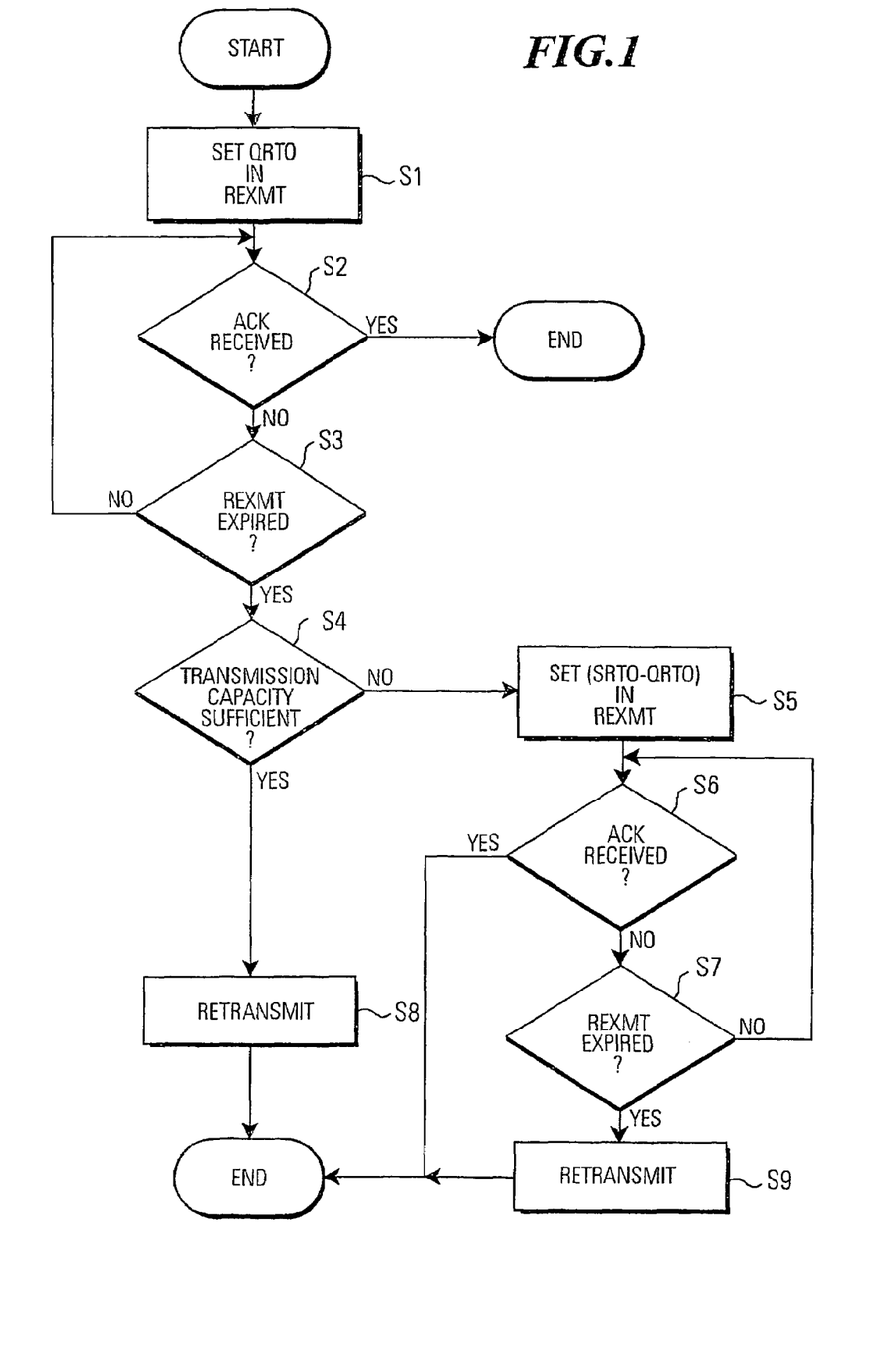
FIG. 1 is a flow chart showing a first embodiment of the present invention.

FIG. 1 shows a flow chart of a first embodiment of the present invention. The processing of FIG. 1 starts upon the occurrence of a predetermined event that triggers a time-out monitoring procedure. Such a time-out monitoring procedure triggering event can be chosen in any suitable or desirable way. For example, it can be the first sending of a data unit (i.e. the data unit has as of yet not been sent), which is also referred to as the initial transmission of a data unit. Then, the ensuing time-out monitoring procedure can relate to the question of whether to retransmit said data unit or not. However, a time-out monitoring procedure can also be triggered by other events, e.g. every time a timer designed to count down the time-out period expires, in which case the designated data unit for which it is determined whether a feedback message arrives within the time-out period, can be the oldest data unit for which no feedback message has yet been received, e.g. for the oldest unacknowledged data unit if acknowledgments for the correct receipt are used as feedback messages. As another example if acknowledgments are used, the triggering event can be the receipt of an acknowledgment. In this case, the designated data unit can again be the oldest outstanding or unacknowledged data unit.

In a first step S1, a short time-out period is set in an appropriate timer. This timer will also be referred to as a retransmission timer REXMT, and the shorter time-out period will also be referred to as the quick retransmission timeout value QRTO. Therefore, step S1 consists in setting REXMT to the value of QRTO. Furthermore, REXMT is set to start counting down the value.

Then, in a time-out monitoring sub-procedure consisting of steps S2 and S3, it is determined whether an acknowledgment of the designated data unit (e.g. the data unit of which the initial transmission triggered the time-out monitoring, or the oldest outstanding data unit, or any other suitable selected data unit) has been received, and in step S3 it is determined whether the timer REXMT has expired or not. It may be noted that in the example of FIG. 1 acknowledgment messages are used as an example of feedback messages. However, the invention is by no means restricted to acknowledgments (i.e. messages that indicate whether a data unit was correctly received or not), but feedback messages could also be non-acknowledgment messages (i.e. messages that specifically indicate that a given data unit was not received) or some other form of information that lets the data unit sender know if and how a sent data unit was received.

Returning to the example of FIG. 1, if an acknowledgment, that acknowledges the oldest outstanding segment, is received in step S2, then the triggered procedure ends, because no time-out occurred. If no such acknowledgment is received, it is determined whether REXMT has expired in step S3, and if this is not the case, the procedure loops back to step S2, to continue until either an acknowledgment is received or the timer expires. If the timer REXMT expires, then the procedure passes from step S3 to step S4. In step S4, it is determined whether the available transmission capacity value determined in accordance with the implemented flow control procedure is sufficient for re-transmitting the designated data unit. For example, in window based flow control, this means determining whether the difference between the send window size and the amount of data in outstanding data units is equal to or larger than the size of the designated data unit. In the case of rate based flow control, this means calculating the allowed momentary rate and determining whether the presently used rate is sufficiently below the allowed rate, in order to retransmit the designated data unit. If step S4 determines that the available transmission capacity value is sufficient, then the procedure goes to step S8, in which the designated data unit is retransmitted. The procedure can then end.

On the other hand, if step S4 determines that the transmission capacity is not sufficient, e.g. the transmission capacity value allowed for the data sender would be exceeded if the designated data unit were retransmitted, then the procedure goes to step S5, in which the retransmission timer REXMT is reset and restarted with a value (SRTO-QRTO), SRTO being a larger time-out period than QRTO. After step S5, the time-out monitoring procedure is continued with steps S6 and S7, in which it is determined whether an acknowledgment is received for the designated data unit (step S6) and whether the retransmission timer REXMT has expired or not (step S7). This is basically the same procedure as already explained in connection with steps S2 and S3. If an acknowledgment is received, the time-out monitoring procedure ends, as no time-out has occurred. Otherwise, if no acknowledgment is received within the time-out period, a retransmission is performed in step S9, and the procedure ends thereafter.

Due to the procedure of steps S5 to S9, this effectively means that the time-out period is prolonged to SRTO. Preferably, when applying the present invention to a given data unit sender that already implements a time-out monitoring procedure, the value of SRTO is selected as equal to the standard value for the single time-out period defined for that given data unit sender. For example, if the data unit sender is TCP sender, then SRTO may be selected as equal to the standard retransmission time-out value RTO defined in TCP.

By defining SRTO as the standard time-out period of the data sender to which the invention is applied, this means that if the outcome of step S4 is negative, i.e. no retransmission is conducted upon expiration of QRTO, then the data unit sender simply continues monitoring the time-out period like in the conventional case, i.e. until SRTO expires.

It should be noted that the data unit sender can conduct a number of procedures as shown in FIG. 1 simultaneously, i.e., it can monitor the time-out for a plurality of designated data units in parallel. Naturally, it is also possible that the data unit sender only monitors one time-out at a time.

Although the embodiment shown in FIG. 1 is a basic embodiment, it may be varied in very many ways. For example, the order of the steps may be changed, and the steps can also be implemented in a different way. For example, it is not necessary to set a value in step 1 and count it down, as it is equally possible to initialise a timer in step S1, let the timer count upwards and then determine in steps S3 and S7 whether the timer has reached predetermined values. It is also possible to use a timer that outputs an absolute time value, and in this case no step S1 is necessary, and in steps S3 and S7 it is determined whether predetermined absolute time values have been reached by the timer.

As mentioned above, the value of SRTO is preferably chosen to correspond to a standard time-out period. In accordance with the invention, the second time-out period QRTO is shorter than SRTO. In principle, QRTO can be chosen to have any desirable value smaller than SRTO. Preferably, the value of QRTO is chosen to be larger than or equal to a predetermined fraction, more preferably one half of the larger time-out value SRTO.

In accordance with another embodiment for determining the value of QRTO, it is preferred that QRTO be determined on the basis of one or more measured feedback response time values. A feedback response time value is a value indicative of the time that passes between the sending of a data unit and the receipt of a feedback message for said sent data unit. In the context of TCP (and other protocols) the so-called round trip time RTT is an example of such a feedback response time.

The data unit sender can be arranged to continuously measure samples of the feedback response time. It may be noted that it is preferably that the longer time-out period SRTO is also determined in dependence on one or more measured feedback response times. For example, in TCP the standard time-out value RTO is determined on the basis of measured round trip times RTT.

Under the assumption that SRTO is indeed determined on the basis of measured feedback response times, and arranged to be larger than the feedback response times, QRTO can e.g. be chosen to be equal to the last measured feedback response time, or equal to the maximum of the last measured feedback response time and SRTO/2. More preferably, QRTO is determined as the maximum of the last measured feedback response time, SRTO/2 and a smoothed average value of the feedback response time. An example of such a smoothed average is the parameter smoothed round trip time SRTT defined in the context of TCP.

Other possibilities of determining the value of QRTO are possible, e.g.

QRTO=last measured feedback response time+(1/n×(last measured feedback response time)), n=1, 2, 3, . . . , QRTO=MAX (last measured feedback response time+(1/m·(last measured feedback response time)); smoothed feedback response time), with m=1, 2, 3, . . . , QRTO=the maximum of the last k measured feedback response times, where k is a natural number.

As already mentioned, these are only examples, and the value of QRTO can be chosen as is suitable or appropriate for the given application.

Figure 2A:
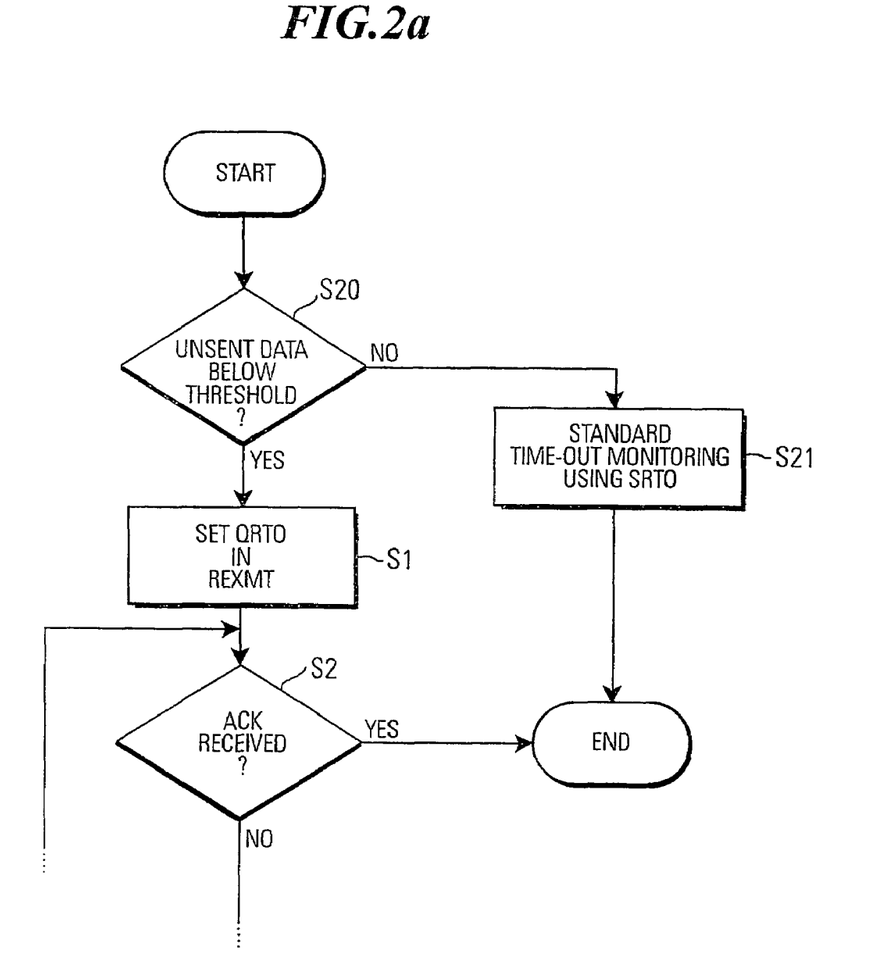
FIG. 2a is a modification of the embodiment of FIG. 1.

Now reference will be made to FIG. 2a. FIG. 2a shows a variation of the embodiment of FIG. 1. Namely, the method described by FIG. 2a contains an additional step S20, where said step S20 precedes steps S1 shown in FIG. 1. All the steps after step S1 are the same as in FIG. 1. Consequently, FIG. 2a does not show the further processing. Step S20 is performed after the detection of a time-out monitoring procedure triggering event, and determines whether the amount of unsent data in the send buffer is smaller than or equal to a predetermined threshold value. If this is not the case, e.g. there is more unsent data than defined by the threshold value, then the procedure goes to step S21, in which a standard time-out monitoring procedure is conducted, using the larger time-out period SRTO, preferably a standard time-out period. This is not shown in more detail and can e.g. be accomplished using a monitoring procedure as shown in steps S2, S3 or S6, S7 in FIG. 1. On the other hand, if the amount of unsent data is equal to or smaller than the threshold, then the inventive procedure explained in connection with FIG. 1 is conducted, i.e. the procedure goes to step S1.

In the embodiment according to FIG. 2a, the control procedure using the shorter, more aggressive value QRTO is only entered if initially the amount of unsent data in the send buffer is not beyond a given limit or threshold. This means that the possibility of using a shorter time-out period is not provided if there is more than a certain amount of yet unsent data to be transmitted. In other words, this embodiment gives priority to the sending of unsent data over the possibility of achieving a faster retransmission of a possibly lost data unit.

The threshold value used in step S20 can be chosen in any suitable or desirable way. For example, it can be set to zero, which means that the possibility of quicker retransmission is only enabled if at the time of triggering the time-out period the send buffer for previously unsent data is empty, i.e. there is no yet unsent data to be sent. Naturally, a larger value can also be chosen for the threshold, e.g. one or a predetermined multiple of a maximum data unit size defined by the flow control procedure. For example, in the context of TCP, such a maximum data unit size is also referred to as maximum segment size MSS.

Figure 2B:
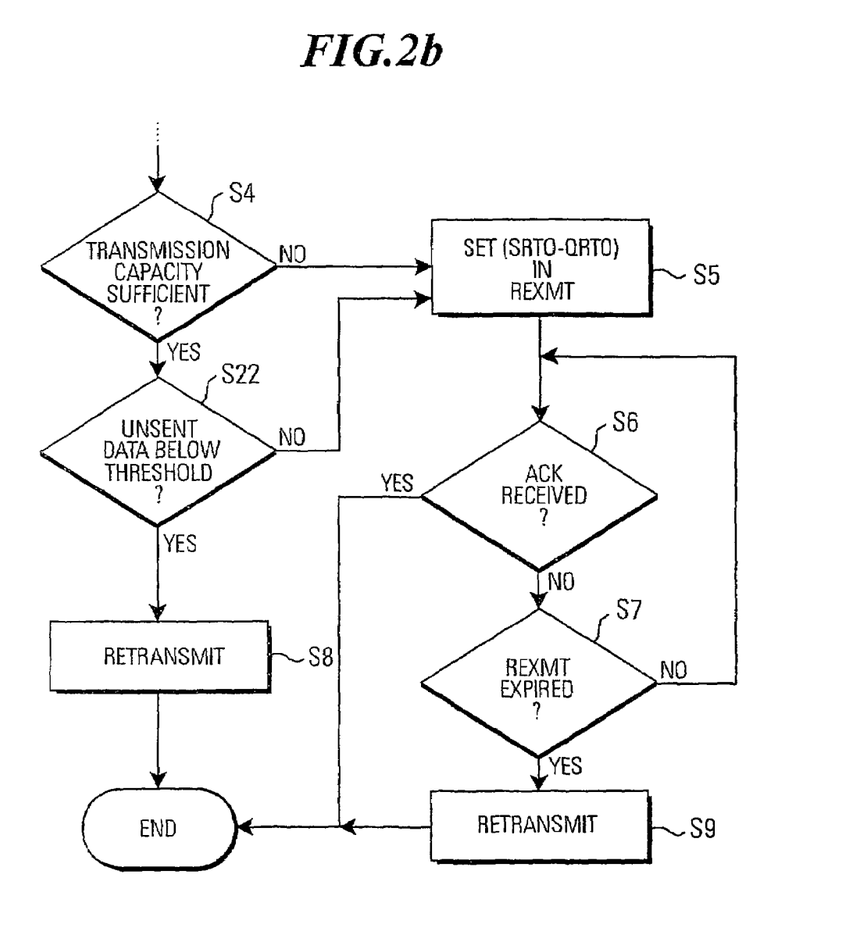
FIG. 2b is a further modification of the embodiment of FIG. 1.

FIG. 2b shows a further variation of the embodiment of FIG. 1, where the embodiment of FIG. 2b may or may not be combined with FIG. 2a. In FIG. 2b, an additional step S22 is provided, which in itself is identical to the step S20 discussed in connection with FIG. 2a. Namely, after step S4 determines that the transmission capacity is sufficient for allowing a retransmission of the designated data unit, step S22 determines whether the amount of unsent data in the send buffer is below a predetermined threshold. If this is not the case, then the quick retransmit of step S8 is not performed, much rather the procedure goes to step S5, step S5 and the subsequent steps S6, S7 and S9 already having been explained in connection with FIG. 1, such that no repetition is necessary.

Only if the amount of unsent data is below the predetermined threshold (or still below the predetermined threshold if the embodiment of FIG. 2b is combined with that of FIG. 2a), is the quicker retransmit in accordance with the shorter time-out period QRTO conducted in step S8.

It may be noted that steps S20 and S22 can also implemented together, but using respectively different threshold values.

The effect of the additional step S22 discussed in connection with FIG. 2b, is similar to that of step S20 discussed in connection with FIG. 2a, namely to give the sending of unsent data priority over a quick retransmission. The quick retransmission in accordance with the shorter time-out period QRTO is only conducted if the amount of unsent data is not too great, i.e. not above a predetermined threshold.

According to further preferred embodiments of the present invention, the time-out monitoring procedure conducted in the data unit sender is furthermore arranged to perform a congestion control procedure subsequent to the expiration of the shorter time-out period QRTO. The congestion control procedure comprises an adjustment procedure for adjusting one or more parameters used in the flow control procedure, such that the amount of previously unsent data that the sender is allowed to send at once is reduced. For example, in the case of window based flow control the adjustment procedure can consist in reducing the send window, and in the case of rate base flow control reducing the allowed transmit rate. The purpose of such measures is to reduce the load on the network transporting the sent data units. Taking TCP as an example, one parameter that can be adjusted as a part of a congestion control procedure is the so-called congestion window cwnd, and another is the so-called slow start threshold ssthresh. Both parameters are described and defined in chapter 21 of the book "TCP/IP Illustrated", Volume 1, The Protocols by W. Richard Stevens, Addison Wesley Longman Corp., 1994, such that a further description of the parameters is not necessary here.

Figure 3:
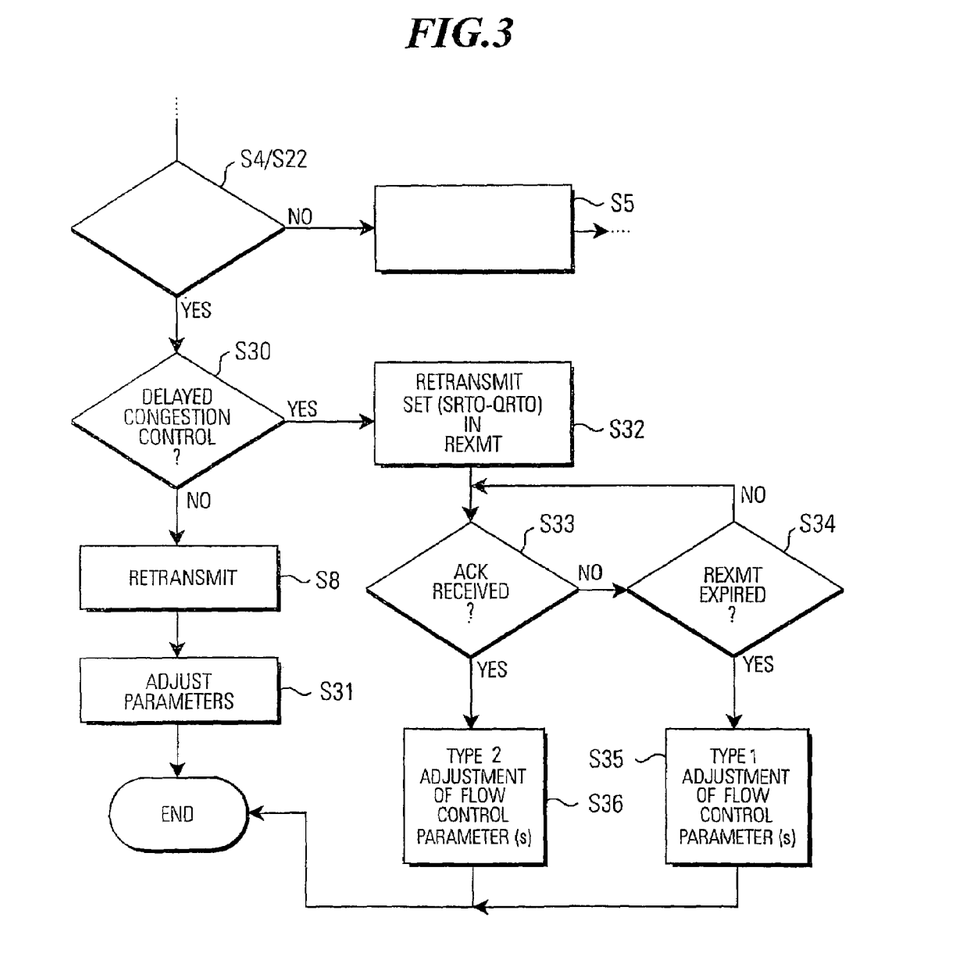
FIG. 3 is a flow chart of a further modification of the preceding embodiments.

FIG. 3 shows an example in which congestion control is implemented in addition to the basic time-out monitoring steps discussed in FIGS. 1, 2a and 2b.

The procedure shown in FIG. 3 can be combined with that shown in FIG. 1 or FIG. 2b, and would be performed subsequent to step S4 (in the example of FIG. 1) or step S22 (in the example of FIG. 2b), which is indicated schematically at the top of FIG. 3. Step S5 known from FIGS. 1 and 2b is also indicated in FIG. 3, but the steps subsequent thereto (S6, S9) are no longer shown for simplicity.

In the example of FIG. 3, a step S30 is shown, in which it is determined whether delayed congestion control should be performed or not. If no delayed congestion control is performed, then upon expiration of the short time-out period QRTO the designated data unit is retransmitted in step S8 and an adjustment of flow control parameters is conducted in step S31. It may be noted that it is not necessary to implement step S30, and if it is desired to always combine the retransmission of step S8 with an adjustment of one or more flow control parameters as a part of a congestion control procedure, step S31 could also simply be added to the flow charts of FIG. 1 or 2b, immediately before or immediately after step S8.

However, preferably step S30 is implemented as an option for operating the data unit sender. In other words, when the data unit sender is configured, it can be configured to perform a delayed congestion control or not. If the delayed congestion control is configured, such that the result of step S30 is "yes", then the procedure passes to step S32, in which a retransmission is conducted and then the retransmission timer REXMT is set to (SRTO-QRTO). Then, an intermediate monitoring procedure during the intermediate period (SRTO-QRTO) is conducted, in order to determine whether a feedback message (e.g. an acknowledgment) is received within said intermediate period SRTO-QRTO. In accordance with the preferred embodiment of FIG. 3, the adjustment procedure is such that a different type of adjustment of flow control parameters is conducted, depending on the outcome of said intermediate monitoring procedure. Namely, if the timer expires (outcome of step S34=yes), then a first type of flow control parameter adjustment is conducted, and if a feedback message is received within the period (SRTO-QRTO), a second type of adjustment of flow control parameters is conducted.

If the procedure goes to step S35, i.e. the first type of adjustment, this means that the retransmission timer REXMT has expired without having an acknowledgment for the designated data unit. In other words, no acknowledgment has been received within the long time-out period SRTO. As a consequence, it can be assumed that the data unit was lost. Consequently, the type one adjustment of flow control parameters in step S35 is arranged such that it appropriately responds to the loss of a data unit.

On the other hand, if the procedure passes to step S36, this means that although no acknowledgment was received within the short time-out period QRTO, an acknowledgment was received within the longer time-out period SRTO. As a consequence, it is well possible that the designated data unit was not lost. It may be remarked that if the acknowledgment received in step S32 was for the retransmission performed in step S32, then this is an indication that the original transmission was lost, whereas if the acknowledgment received in step S33 relates to the original transmission, it is clear that this original transmission was definitely not lost. However, the example of FIG. 3 does not distinguish between which transmission (i.e. initial transmission or retransmission) the acknowledgment message relates to, such that the conclusion from having arrived at step S36 is that the probability of the designated data unit not having been lost is in any case larger than that probability when having arrived at step S35. Consequently, the second type adjustment of flow control parameters performed in step S36 takes this conclusion into account, and will be arranged in such a way that the flow control procedure is not limited as strongly with respect to the amount of data it can send at once, as for the type adjustment performed in step S35.

To give an example in the context, of TCP, the type one adjustment performed in step S35 could consist in reducing the congestion window to the predetermined size designed to combat data loss, said predetermined size being referred to as the loss window in the present application. In present day implementation of TCP, the loss window is typically one MSS, but could be in principle also be a different value. Furthermore, step S35 in the context of TCP could provide that the slow start threshold ssthresh is reduced to one half the value of the congestion window prior to the reduction of the loss window. On the other hand, the type two adjustment of step S36 could consist in again setting the slow start threshold ssthresh to one half the congestion windows size, but to only reduce the congestion window to one half its size, as opposed to the stronger reduction in step S35. Naturally, these are only examples, and the parameters can also be changed in a different fashion, as is suitable or desirable.

In general, it may be said that the adjustment of type 2 in step S36 will influence the flow control procedure in such a way that the subsequent reduction in allowed transmission capacity for reducing the load on the communication network will be lesser than the reduction in allowed transmission capacity caused by the adjustment of type 1 in step S35. This can go so far as to not performing any changes to the flow control parameters in step S36.

It may be noted that the adjustment procedure for flow control parameters can also be used as a trigger for monitoring a time-out period. The type one adjustment procedure of step S35 could e.g. comprise restarting REXMT with (SRTO+QRTO), while the adjustment procedure in step S31 could e.g. comprise restarting REXMT with 2×SRTO.

Figure 4:
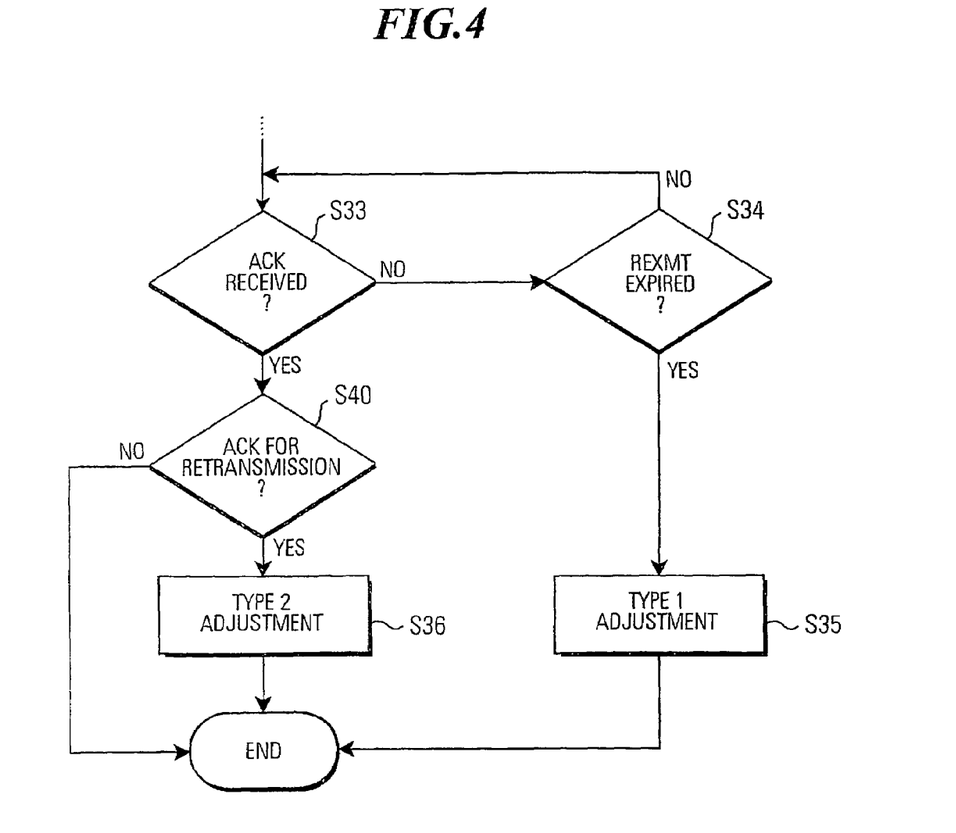
FIG. 4 is a flow chart of a modification of the embodiment of FIG. 3.

FIG. 4 shows a preferred variation of the embodiment of FIG. 3, in that an additional step S40 is provided subsequent to step S33. The remaining steps are identical to those shown in FIG. 3, such that a renewed description is not necessary. In the example of FIG. 4, the data unit sender is arranged to be able to distinguish whether a received feedback message relates to the retransmission of the designated data unit performed in step S32, or to a prior transmission of the designated data unit. Then, step S40 is arranged to distinguish whether the feedback message (e.g. acknowledgment) relates to the retransmission sent in S32, or not. If the acknowledgment received in step S33 does not relate to the retransmission of step S32, then the overall adjustment procedure is such that the flow control parameters are left unchanged, as the result of step S40 indicates that the designated data unit was in fact not lost. As it was not lost, there is no necessity to perform any congestion control measures, because there is in fact no indication of strong congestion in the network. Although not shown, it is however also conceivable to provide an arbitrary third type adjustment of flow control parameters in response to determining that the acknowledgment received in step S33 does not relate to the retransmission of step S32.

The capability of the data unit sender or the intermediate monitoring procedure to distinguish between feedback messages relating to the retransmission or a prior transmission, can be implemented in any suitable or desirable way. For example, this can be accomplished with the help of a time-stamp function, according to which the data unit sender includes a time-stamp in each sent data unit, and the receiver includes the same time-stamp in feedback messages, such that the data unit sender can unambiguously identify to which transmission a feedback message relates. Another possibility of distinguishing between different transmissions is to include a specific initial transmission/retransmission identifier in sent data units, which can be as simple as a single bit that differentiates between an initial transmission and a retransmission.

Figure 5:
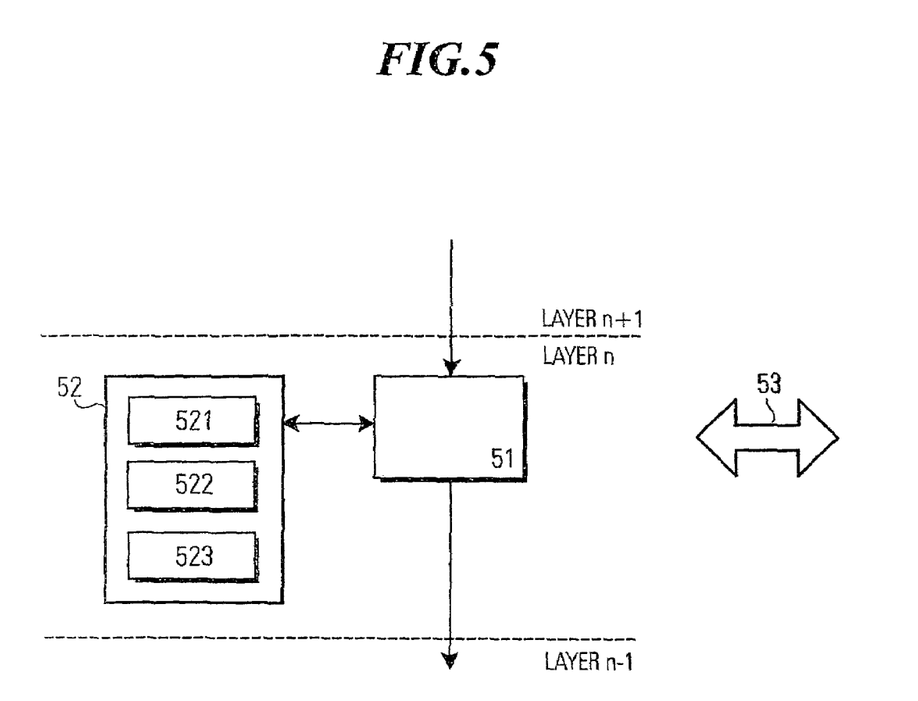
FIG. 5 is a schematic block diagram representing an embodiment of a data unit sender according to the present invention.

FIG. 5 shows a schematic block diagram of a data unit sender arranged in accordance with the present invention. FIG. 5 shows a send buffer 51 and a control unit 52. For example, the send buffer 51 can be any type of memory suitable for buffering data, and the control unit 52 can be a microprocessor. The data unit sender is represented in FIG. 5 as a peer in a communication at a protocol layer n, where the communication with the receiving peer is symbolized by double-arrow 53. The buffer 51 receives data from a higher layer n+1 and prepares data units that adhere to the protocol according to which the data unit sender is implemented, under the control of control unit 52, and passes these data units to a lower layer n−1. The control unit 52 is schematically indicated as comprising a flow controller 521 for controlling the flow of data sent by the data unit sender, a detector 522 for detecting a time-out monitoring procedure triggering event, and a time-out monitor 523 for determining whether a time-out has occurred within a short time-out period QRTO or within a longer time-out period SRTO, in accordance with the methods described in connection with FIGS. 1 to 4. In this way, the control unit 52 is arranged to implement the various method embodiments described above.

The data unit sender of the present invention can be implemented in the form of hardware, software or any suitable combination of hardware and software. Therefore, the present invention can also be embodied as a computer program that is arranged to execute one of the methods described in connection with FIGS. 1 to 4 when loaded into and executed by a device that is connectable to a communication network and can act as a data unit sender, such as a personal computer suitably connected to the Internet or a mobile communication device arranged for data unit communication, and the present invention can be embodied by a data carrier carrying such a computer program.

It is again repeated that the present invention is by no means restricted to the specific embodiments described above, and that the invention is defined by the appended claims. Furthermore, reference signs in the claims only serve to make the claims easier to read but are not meant to be restrictive.

The invention claimed is:

1. A method of controlling a data unit sender, having a send buffer for storing data units to be sent, arranged to operate in accordance with a communication protocol that provides for a feedback function, wherein a sender in a data unit communication receives feedback messages from a receiver that reports on the receipt of data units, said method comprising:
controlling the flow of data sent by said data unit sender, such that at any given moment the amount of previously unsent data that the sender can send at once is limited by an available transmission capacity value,
detecting a time-out monitoring procedure triggering event,
utilizing a time-out monitoring procedure for monitoring whether a feedback message for a designated data unit arrives before a predetermined time-out period (S-RTO) has expired, said predetermined time-out period (S-RTO) starting at the occurrence of the time-out monitoring procedure triggering event, and for retransmitting the designated data unit if said predetermined time-out period (S-RTO) expires without said acknowledgment message having arrived, wherein said predetermined time-out period (S-RTO) is a first time-out period, and
utilizing said time-out monitoring procedure to perform a retransmission of said designated data unit upon expiration of a second time-out period (Q-RTO) shorter than said first time-out period, if upon the expiration of said second time-out period (Q-RTO) said available transmission capacity value for unsent data is greater or equal to the size of said designated data unit.

2. The method according to claim 1, wherein said designated data unit is only retransmitted upon expiration of said second time-out period (Q-RTO) if the amount of unsent data in said send buffer is smaller than or equal to a threshold value.

3. The method according to claim 1, wherein said time-out monitoring procedure is arranged to perform a congestion control procedure subsequent to the expiration of said second time-out period (Q-RTO), said congestion control procedure comprising an adjustment procedure for adjusting one or more parameters used by said flow control procedure such that the amount of previously unsent data that the sender is allowed to send at once is reduced.

4. The method according to claim 3, wherein said congestion control procedure is arranged to perform said adjustment procedure upon expiration of said second time-out period (Q-RTO).

5. The method according to claim 3, wherein said congestion control procedure is arranged to delay performing said adjustment procedure, and to perform an intermediate monitoring procedure during an intermediate period between the expiration of said second time-out value (Q-RTO) and said first time-out value (S-RTO), said intermediate monitoring procedure being arranged to detect whether a feedback message relating to said designated data unit arrives within said intermediate period, and said adjustment procedure being arranged to respond to the outcome of said intermediate monitoring procedure to perform a first adjustment of said one or more parameters if no feedback message relating to said designated data unit arrives within said intermediate period, and to perform a second adjustment of said one or more parameters if a feedback message relating to said designated data unit arrives within said intermediate period, said first adjustment being different from said second adjustment.

6. The method according to claim 5, wherein said intermediate monitoring procedure is arranged to be able to distinguish whether a received feedback message relating to said designated data unit relates to the retransmission of said designated data unit performed upon expiration of said second time-out value (Q-RTO) or to a prior transmission of said designated data unit, and said adjustment procedure being arranged to leave said one or more parameters unchanged if said received feedback message relates to a prior transmission of said designated data unit.

7. The method according to claim 1, wherein said flow control procedure is window based and arranged to determine said available transmission capacity value on the basis of the difference between a send window and an amount of outstanding data.

8. The method according to claim 1, wherein said flow control procedure is rate based and arranged to determine said available transmission capacity value on the basis of an allowable transmit rate.

9. The method according to claim 1, comprising a procedure for measuring a feedback response time (RTT), said feedback response time being indicative of the time that passes between the sending of a data unit and the receipt of a feedback message relating to said feedback message, wherein said second time-out value (Q-RTO) is determined in dependence on one or more measured feedback response time values.

10. The method according to claim 9, wherein said first time-out value (S-RTO) is also determined in dependence on one or more measured feedback response time values.

11. The method according to claim 1, wherein said second time-out value (O-RTO) is larger than or equal to a fraction of the first time-out value.

12. The method according to claim 1, wherein said data unit sender is arranged to operate in accordance with the Transmission Control Protocol TCP, and said first time-out value is the standard TCP Retransmission Time-Out parameter RTO.

13. A data unit sender arranged to operate in accordance with a communication protocol that provides for a feedback function according to which a sender in a data unit communication receives feedback messages that report on the receipt of data units, comprising:
a send buffer for storing data units to be sent,
a flow controller for controlling the flow of data sent by said data unit sender, said flow controller implementing a flow control procedure arranged such that at any given moment the amount of previously unsent data that the sender can send at once is limited by an available transmission capacity value,
a detector for detecting a time-out monitoring procedure triggering event,
a time-out monitor for monitoring whether a feedback message for a designated data unit arrives before a predetermined time-out period (S-RTO) has expired, said predetermined time-out period (S-RTO) starting at the occurrence of the time-out monitoring procedure triggering event, and for retransmitting the designated data unit if said predetermined time-out period (S-RTO) expires without said acknowledgment message having arrived, wherein said predetermined time-out period (S-RTO) is a first time-out period, and said time-out monitor is arranged to perform a retransmission of said designated data unit upon expiration of a second time-out period (Q-RTO) shorter than said first time-out period, if upon the expiration of said second time-out period (Q-RTO) said available transmission capacity value for unsent data is greater or equal to the size of said designated data unit.

14. The data unit sender according to claim 13, wherein time-out monitor is arranged such that said designated data unit is only retransmitted upon expiration of said second time-out period (Q-RTO) if the amount of unsent data in said send buffer is smaller than or equal to a threshold value.

15. The data unit sender according to claim 13, wherein said time-out monitor is furthermore arranged to perform a congestion control procedure subsequent to the expiration of said second time-out period (Q-RTO), said congestion control procedure comprising an adjustment procedure for adjusting one or more parameters used by said flow control procedure such that the amount of previously unsent data that the sender is allowed to send at once is reduced.

16. The data unit sender according to claim 15, wherein said congestion control procedure is arranged to perform said adjustment procedure upon expiration of said second time-out period (Q-RTO).

17. The data unit sender according to claim 15, wherein said congestion control procedure is arranged to delay performing said adjustment procedure, and to perform an intermediate monitoring procedure during an intermediate period between the expiration of said second time-out value (Q-RTO) and said first time-out value, said intermediate monitoring procedure being arranged to detect whether a feedback message relating to said designated data unit arrives within said intermediate period, and said adjustment procedure being arranged to respond to the outcome of said intermediate monitoring procedure to perform a first adjustment of said one or more parameters if no feedback message relating to said designated data unit arrives within said intermediate period, and to perform a second adjustment of said one or more parameters if a feedback message relating to said designated data unit arrives within said intermediate period, said first adjustment being different from said second adjustment.

18. The data unit sender according to claim 17, wherein said intermediate monitoring procedure is arranged to be able to distinguish whether a received feedback message relating to said designated data unit relates to the retransmission of said designated data unit performed upon expiration of said second time-out value (Q-RTO) or to a prior transmission of said designated data unit, and said adjustment procedure being arranged to leave said one or more parameters unchanged if said received feedback message relates to a prior transmission of said designated data unit.

19. The data unit sender according claim 13, wherein said flow control procedure is window based and arranged to determine said available transmission capacity value on the basis of the difference between a send window and an amount of outstanding data.

20. The data unit sender according to claim 13, wherein said flow control procedure is flow rate based and arranged to determine said available transmission capacity value on the basis of an allowable transmit rate.

21. The data unit sender according to claim 13, comprising an element for measuring a feedback response time (RTT), said feedback, response time being indicative of the time that passes between the sending of a data unit and the receipt of a feedback message relating to said feedback message, wherein said data unit sender is arranged to determine said second time-out value (Q-RTO) in dependence on one or more measured feedback response time values.

22. The data unit sender according claim 13, wherein said data unit sender is arranged to also determine said first time-out value in dependence on one or more measured feedback response time values.

23. The data unit sender according to claim 13, wherein said second time-out value (Q-RTO) is larger than or equal to one half of the first time-out value.

24. The data unit sender according to claim 13, wherein said data unit sender is arranged to operate in accordance with the Transmission Control Protocol TCP, and said first time-out value (S-RTO) is the standard TCP Retransmission Time-Out parameter RTO.

* * * * *

UNITED STATES PATENT AND TRADEMARK OFFICE
CERTIFICATE OF CORRECTION

PATENT NO. : 7,444,578 B2
APPLICATION NO. : 10/535355
DATED : October 28, 2008
INVENTOR(S) : Meyer et al.

It is certified that error appears in the above-identified patent and that said Letters Patent is hereby corrected as shown below:

In Column 12, Line 42, in Claim 11, delete "(O-RTO)" and insert -- (Q-RTO) --, therefor.

In Column 14, Line 15, in Claim 19, delete "according" and insert -- according to --, therefor.

In Column 14, Line 20, in Claim 20, delete "according" and insert -- according to --, therefor.

In Column 14, Line 24, in Claim 21, delete "according" and insert -- according to --, therefor.

In Column 14, Line 32, in Claim 22, delete "according" and insert -- according to --, therefor.

In Column 14, Line 36, in Claim 23, delete "according" and insert -- according to --, therefor.

In Column 14, Line 39, in Claim 24, delete "according" and insert -- according to --, therefor.

Signed and Sealed this

Twenty-eighth Day of April, 2009

JOHN DOLL
*Acting Director of the United States Patent and Trademark Office*